(12) United States Patent
Bezzam et al.

(10) Patent No.: US 11,073,861 B2
(45) Date of Patent: Jul. 27, 2021

(54) DIGITAL CIRCUITS FOR RADICALLY REDUCED POWER AND IMPROVED TIMING PERFORMANCE ON ADVANCED SEMICONDUCTOR MANUFACTURING PROCESSES

(71) Applicant: Rezonent Microchips Pvt. Ltd., Thrissur (IN)

(72) Inventors: Ignatius Bezzam, Thrissur (IN); Neelam Rawat, Bangalore (IN)

(73) Assignee: Rezonent Microchips Pvt. Ltd., Thrissur (IN)

( * ) Notice: Subject to any disclaimer, the term of this patent is extended or adjusted under 35 U.S.C. 154(b) by 0 days.

(21) Appl. No.: 16/962,517

(22) PCT Filed: Mar. 6, 2018

(86) PCT No.: PCT/IN2018/050121
§ 371 (c)(1),
(2) Date: Jul. 16, 2020

(87) PCT Pub. No.: WO2019/142203
PCT Pub. Date: Jul. 25, 2019

(65) Prior Publication Data
US 2020/0348717 A1 Nov. 5, 2020

(30) Foreign Application Priority Data
Jan. 16, 2018 (IN) .............................. 201841001752

(51) Int. Cl.
*G06F 1/10* (2006.01)
*H03K 3/037* (2006.01)
(Continued)

(52) U.S. Cl.
CPC ............... *G06F 1/10* (2013.01); *H03K 3/012* (2013.01); *H03K 3/037* (2013.01); *H03K 19/21* (2013.01)

(58) Field of Classification Search
CPC .......... G06F 1/10; H03K 3/012; H03K 3/037; H03K 19/21
(Continued)

(56) References Cited

U.S. PATENT DOCUMENTS 6,147,541 A * 11/2000 Seesink ................ H03K 3/0231
327/337
7,459,940 B2 * 12/2008 Franch ........... H03K 19/018521
326/95

OTHER PUBLICATIONS

Bezzam et al. ("A pulsed resonance clocking for energy recovery"; IEEE; (pp. 2760-2763) (Year: 2014).*

* cited by examiner

*Primary Examiner* — Metasebia T Retebo

(57) ABSTRACT

Disclosed is a resonant circuit and method for matched clock and data timing performance for improving timing closure of digital circuits on advanced semiconductor manufacturing processes. The matched resonance circuit comprises pulse generator circuit (202) and plurality of generating latches (206A-N) and plurality of sampling latches (304A-N). The pulse generator circuit (202) comprises plurality of inverters (210A-N), optimum resistance (214) and exclusive OR (Ex-OR) gate (218) which are connected in series and a matched capacitance. The pulse generator circuit (202) generates timing pulse output using one or more buffers and clock inductor. Each generating latch receives clock timing pulse output as timing pulse into plurality of sampling flip-flop latches (304A-N) through clock sample path (CS) to match arrival of timing pulse and outputs of plurality of input data lines that are resonated by connecting one or more
(Continued)

of respective load capacitances with at least one shared inductor (208).

9 Claims, 8 Drawing Sheets

(51) Int. Cl.
*H03K 19/21* (2006.01)
*H03K 3/012* (2006.01)

(58) Field of Classification Search
USPC .......................................................... 327/291
See application file for complete search history.

DIGITAL CIRCUITS FOR RADICALLY REDUCED POWER AND IMPROVED TIMING PERFORMANCE ON ADVANCED SEMICONDUCTOR MANUFACTURING PROCESSES

BACKGROUND

Technical Field

The embodiments herein generally relate to a system for improving timing performance and timing closure in digital circuits, and, more particularly, to matched resonant circuits and a method for matched clock and data timing performance, and for improving timing closure in the digital circuits for increased speed that is divided by power performance on advanced semiconductor manufacturing processes. In addition to the above, the timing improvement is the ability of said circuits and method to recover and recycle electrical energy on a plurality of circuit nodes.

Description of the Related Art

In designing electronic circuits and systems, computer-automated design systems are used for defining and verifying various prototype circuit configurations. As part of the circuit definition, the circuit designer specifies delay constraints that should be satisfied when the prototype circuit is fabricated.

In conventional approaches to circuit design, the following steps are typically performed: (a) a load capacitance for each cell in the circuit is estimated using a fan-out based model, (b) the size of each cell is set to optimize timing of the circuit, (c) the cells are placed, and the net (wire) lengths of the circuit are estimated, (d) the wires are routed and (e) final analysis is made to determine whether timing closure (i.e., satisfaction of timing constraints) is achieved.

In step (b), the sizes of cells within the circuit are chosen and held constant once chosen. The placement algorithm used thereafter will assign different net lengths between cells, and these lengths have conventionally been difficult to predict prior to placement. While net lengths have been estimated prior to placement by use of an estimation function or table, which gives the load value of a net based on the number of fanout gates, this estimation function is usually inaccurate. This difficulty in accurately predicting net lengths leads to unpredictable delay effects after cell placement occurs. For example, some nets turn out to be longer in length than expected. These longer nets cause longer delays, which prevent satisfaction of timing constraints in the digital circuit. Thus, under the conventional design approach, timing closure is not certain until after placement.

Failure to achieve timing closure after placement leads to additional expenses and other problems for the designer. To correct for failure to achieve timing closure, the designer has the option of fixing the design manually, which is difficult and time consuming because the automatically optimized digital network is not easy to understand. As a second option, the designer may change the Hardware Description Language (HDL) specification and repeat the design process. However, timing closure will again not be certain until after placement. Thus, the design process must again be repeated before the designer can determine if the HDL specification changes were successful in enabling timing closure.

A common method for dealing with inaccurate net load estimates is by estimating the net load at a considerably larger value than typically estimated. Although this method increases the probability of meeting timing constraints after placement, it causes the sizes of the gates to be considerably larger than necessary. Gates that are larger than necessary are wasteful in both silicon area and power consumption. This leads to chips that are larger, more expensive to produce, and use more electrical power than necessary.

Another problem with the conventional circuit design approach concerns the timing analysis required during optimization and during placement. The clock and data timing analysis performed throughout the conventional circuit design process is very time consuming, and accounts for most of the run time of a conventional digital circuit design.

Another disadvantage of the conventional design approach relates to the net length modifications performed by the placement program. Depending on the location chosen for each gate, each net length may be modified. As each net length is modified, the capacitive load of the net will change. As a result, the delays of the gates driving the net will change. Therefore, the delays, which were carefully optimized during the logic design, are very different in value after cell placement, thereby contributing to poor clock and data. Additionally, most of the progress in the state of the art for digital circuit design can be characterized as increased integration, which has led to increasingly complex software systems that are slow and difficult to design and maintain. A further disadvantage with conventional design approaches is in the difficulty of iterating between placement and sizing, since the logic synthesis program is often operated by the logic designer who also wrote the HDL specification, but the placement program is typically done by heuristic CAD software.

Further, existing high-performance Gigabit Very Large Scale Integrated (VLSI) chip designs on Complementary Metal Oxide Semiconductor (CMOS) technology obtain excessive design-time and power to achieve timing performance critical for function of the systems on chip (SoC). This implies considerable cooling costs for the appliance, longer design development cycle and significantly reduced lifetime of reliable operation Accordingly, there remains a need for improving clock and data timing performance and timing closure in digital circuits, and increasing performance on advanced semiconductor manufacturing processes, without excessive energy consumption.

SUMMARY

The present disclosure provides a resonant circuit for matched clock and data timing performance for improving timing closure of digital circuits to increase speed that is divided by power performance on advanced semiconductor manufacturing processes with large on chip variation (OCV) of delays, comprising:
   a pulse generator circuit that comprises (a) a plurality of inverters, (b) an optimum resistance and (c) an exclusive OR (Ex-OR) gate which are connected in series and (d) a matched capacitance, wherein the pulse generator circuit allows a clock input to generate positive timing pulses, generates a timing pulse output using one or more buffers and a clock inductor, and generates precise pulse width timing for resonating parasitic capacitances that cause unknown timing delays and power consumption; and a plurality of generating latches and a plurality of sampling latches that are connected in series with an output of the pulse generator circuit, wherein each of the plurality of generating latches comprises at least one output, wherein the outputs of the plurality of generating latches provide timing for a plurality of input data lines, wherein each of the plurality of data lines comprises at least one logic cell and at least one output, wherein the outputs of the plurality of data lines provide inputs to a plurality of sampling flip-flop latches, wherein the plurality of input data lines are thus passed into the plurality of sampling flip-flop latches, wherein each generating latch receives the clock timing pulse output as a timing pulse into the plurality of sampling flip-flop latches through a clock sample path (CS) to match an arrival of the timing pulse and the outputs of the plurality of input data lines that are resonated by connecting one or more of their respective load capacitances with at least one shared inductor, wherein the input timing pulse and the plurality of input data lines improve the timing performance and timing closure using at least one shared inductor for data and a single clock inductor for clock (e.g. a single matching inductor) respectively.

The present disclosure also provides a method for matched clock and data timing performance for improving timing closure of digital circuits to increase speed that is divided by power performance on advanced semiconductor manufacturing processes with large on chip variation (OCV) of delays, comprising:

allowing a clock input into a pulse generator circuit to generate positive timing pulses, wherein the pulse generator circuit comprises (a) a plurality of inverters, (b) an optimum resistance and (c) an exclusive OR (Ex-OR) gate which are connected in series and (d) a matched capacitance;

generating, using one or more buffers and a clock inductor, a timing pulse output;

generating, using the pulse generator circuit, a precise pulse width timing for resonating parasitic capacitances that cause unknown timing delays and power consumption;

connecting a plurality of generating latches and a plurality of sampling latches in series with an output of the pulse generator circuit, wherein each of the plurality of generating latches comprises at least one output, wherein the outputs of the generating latches providing timing for a plurality of input data lines, wherein each of the plurality of data lines comprises at least one logic cell and at least one output, wherein the outputs of the plurality of data lines provide inputs to a plurality of sampling flip-flop latches, wherein the plurality of input data lines are thus passed into the plurality of sampling flip-flop latches; and receiving the clock timing pulse output as a timing pulse into the plurality of sampling flip-flop latches through a clock sample path (CS) to match an arrival of the timing pulse and the outputs of plurality of input data lines that are resonated by connecting one or more of their respective load capacitances with at least one shared inductor, wherein the input timing pulse and the plurality of input data lines improve the timing performance and timing closure using at least one shared inductor for data and the single clock inductor for clock (e.g. a single matching inductor) respectively.

Embodiments of the present disclosure substantially eliminate or at least partially address the aforementioned drawbacks in existing approaches to achieve the timing closure even though they comprise increased number of transistors in the digital circuits.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
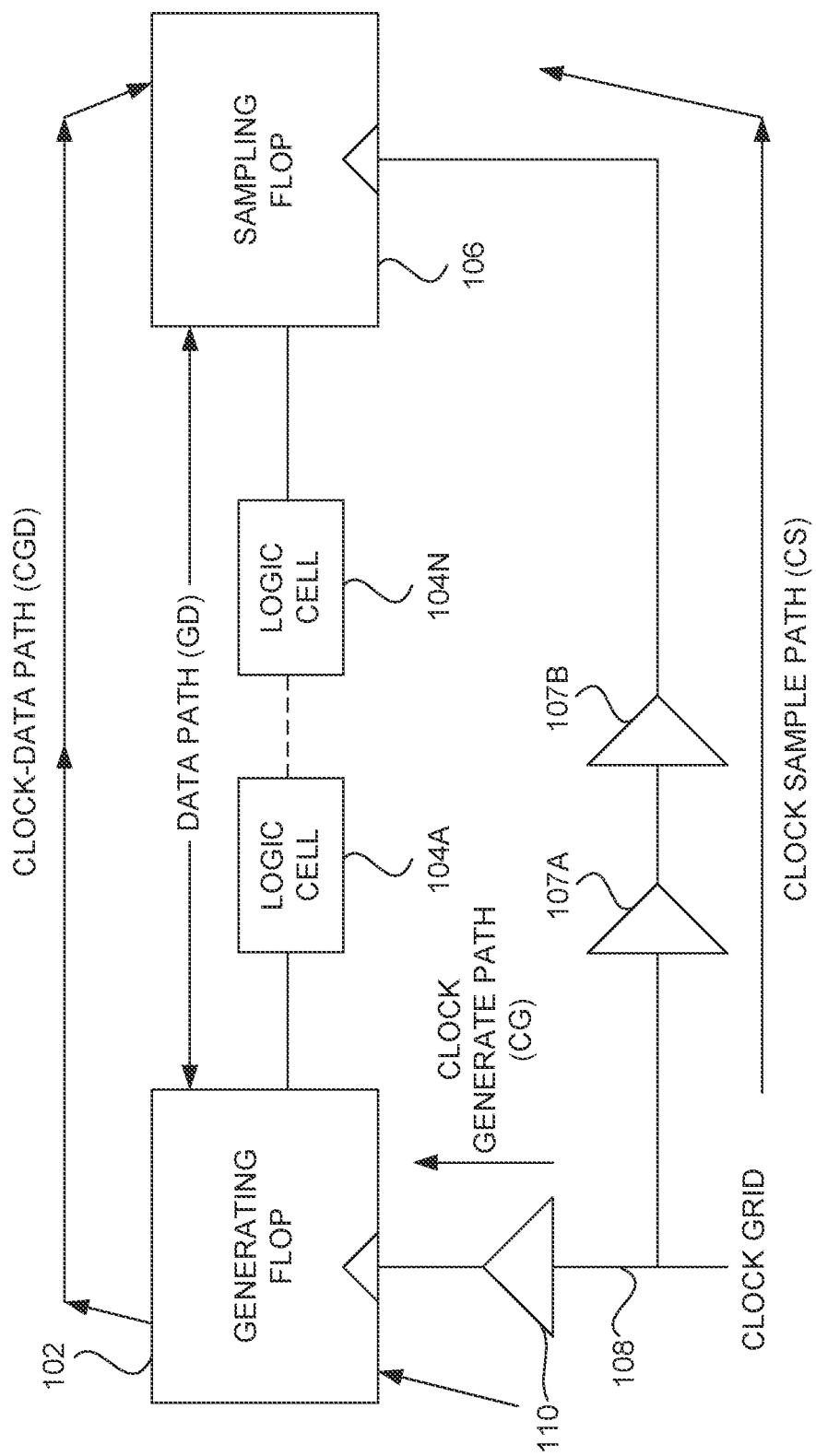
FIG. 1 illustrates a prior-art top level block diagram determining the timing closure constraints.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a resonant circuit for matched clock and data timing performance for improving timing closure of digital circuits to increase speed that is divided by power performance on advanced semiconductor manufacturing processes with large on chip variation (OCV) of delays, comprising:

a pulse generator circuit that comprises (a) a plurality of inverters, (b) an optimum resistance and (c) an exclusive OR (Ex-OR) gate which are connected in series and (d) a matched capacitance, wherein the pulse generator circuit allows a clock input to generate positive timing pulses, generates a timing pulse output using one or more buffers and a clock inductor, and generates precise pulse width timing for resonating parasitic capacitances that cause unknown timing delays and power consumption; and a plurality of generating latches and a plurality of sampling latches that are connected in series with an output of the pulse generator circuit, the plurality of generating latches each comprising at least one output, wherein the outputs of the plurality of generating latches provide timing for a plurality of input data lines, wherein each of the plurality of data lines comprises at least one logic cell and at least one output, wherein the outputs of plurality of data lines provide inputs to a plurality of sampling flip-flop latches, wherein the plurality of input data lines are thus passed into the plurality of sampling flip-flop latches, wherein each generating latch receives the clock timing pulse output as a timing pulse into the plurality of sampling flip-flop latches through a clock sample path (CS) to match an arrival of the timing pulse and the outputs of the plurality of input data lines that are resonated by connecting one or more of their respective load capacitances with at least one shared inductor, wherein the input timing puke and the plurality of input data lines improve the timing performance and timing closure using at least one shared inductor for data and a single clock inductor for clock (e.g. a single matching inductor) respectively.

The matched resonant circuit can be used to improve the timing performance and timing closure of digital circuits on the advance semiconductor manufacturing processes. In addition, the methods described herein that achieve the improved timing closure do so with lesser power consumption. The resonant technique using the matched resonant circuit for the clock and data timing circuits relies on minimizing clock skew using smaller buffer sizes and/or fewer buffers and thus permits less power consumption by the semiconductor chips. The resonant technique can be used for repetitive clock circuits to match (i.e. a meeting of the conditions for Timing Closure in data and clock circuits that uses Pulsed Series Resonance (PSR)) the clock and the plurality of input data lines. The inductors (e.g. the single clock inductor and at least one shared inductor) are used in the matched resonant circuit with parasitic load capacitances that need large amount of power for dynamic operations in semiconductor chips. The resonant technology is uniquely used with tracking clock and data circuits with well-controlled edges that help with the timing error margins from jitter. The power wasted to switch the large distributed capacitance from "1" to a "0" state is pre-emptively captured in the magnetics of on-chip inductors and is successfully reused to power the transitions to "1" in the successive cycles. The data inside the latch circuit can be immune to noise and transitions.

Figure 2A:
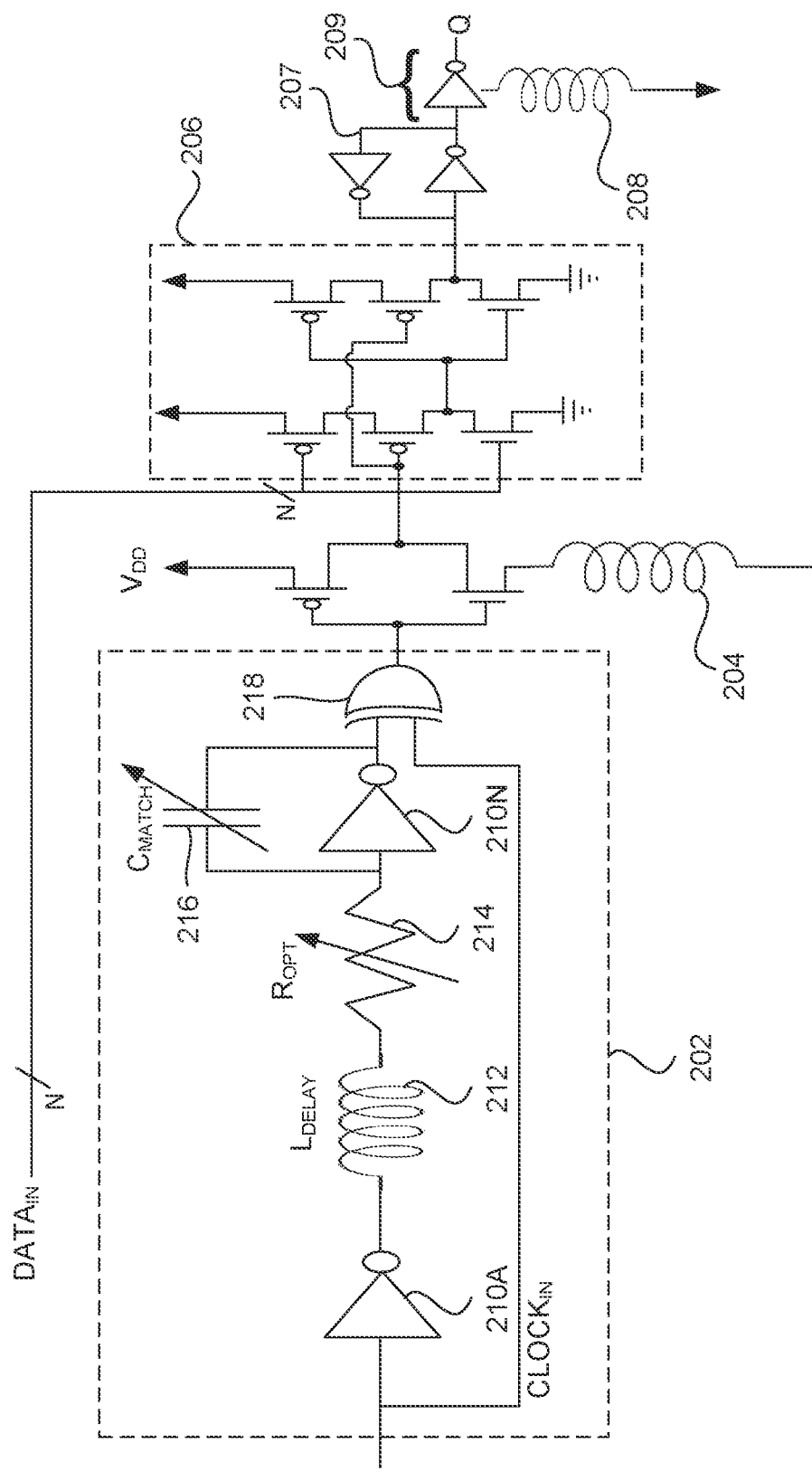
FIG. 2A illustrates a resonant circuit for matched clock and data timing performance for improving timing closure in the digital circuits for increased speed that is divided by power performance on advanced semiconductor manufacturing processes according to an embodiment herein.

In an embodiment, the matched resonant circuit comprises a plurality of logic cells that comprises a clock sample path and a data path (CGD) as shown in FIG. 1. The block diagram of FIG. 1 further comprises a generating flop, the plurality of logic cells, a sampling flop, a clock grid and a (Pulsed Series Resonance) PSR inverter. The PSR inverter is represented as an input to the generating flop. A pulse width of timing pulse ($T_{pw}$ or TR) from the $Clock_{in}$ is set to optimized energy recovery through the PSR inverter. In an embodiment, the generating circuit is represented by a latch circuit among the plurality of sampling flip flop latches as shown in FIG. 2A. The generating flop may comprise a shared inductor. In an embodiment, the shared inductor of the generating flop is physically different from the shared inductor of the sampling flop. In an embodiment, a plurality of sampling flops comprises the shared inductor. Similarly, a plurality of generating flops comprises the shared inductor as the plurality of generating flops is act as a bus (e.g. a 16-bit or 32-bit bus). In an embodiment, the generating flop utilizes the shared inductor for launching pulses. In another embodiment, the sampling flops with the shared inductor captures a complete 32-bit in a floating path.

In an embodiment, the plurality of logic cells is connected in series connection. The plurality of logic cells is promising factors which helps to minimize the timing in terms of timing closure. For example, consider two logic cells in the data path (as shown in FIG. 1). The first logic cell may comprise a fan out option or may be connected to the second logic cell. In an embodiment, the first logic cell or the second logic cell may comprise the fan out option (i.e. the logic cell can be connected to the another generating flop to the sampling flop chain) where the output of either first logic cell or the second logic cell are going to be connected to different logic lines. In an embodiment, the matched resonant circuit is used when the logic cell comprises a large fan out option. The fan out to another generating flop to the sampling flop chain may be identified in the plurality of logic cells (i.e. what is the fan out and what is actual physical capacitive load to identify right logic cells for sharing an inductor).

In an example embodiment, a matched resonance circuit comprises an aggregation of 2 pF of load. The matched resonance circuit is performed with each inductor for every 0.5 pF so that the problems caused by a number of logic cells in the matched resonance circuit is minimized by adding at least one shared inductor for the number of logic cells (e.g. 100 logic cells) and "½ $CV^2$" energy is saved.

In an embodiment, the matched capacitance is connected in parallel to the plurality of inverters, the delay inductance, the optimum resistance and the exclusive OR (Ex-OR) gate. In an embodiment, pulse generator circuit includes a parasitic resistance ($R_p$) that is connected in series with the delay inductance and the plurality of inverters. In another embodiment, the parasitic resistance is connected in parallel with the matched capacitance. The plurality of latches may be a true single-phase clocking (TSPC) latch. The true single-phase clocking comprises a plurality of sampling flip flop latches and a plurality of input data lines. The plurality of sampling flip flop latches in the true single-phase clocking latch circuit are connected to the at least one shared inductor to achieve the timing performance and timing closure on the advanced semiconductor manufacturing processes. In an embodiment, an output inverter along with the single clock inductor (e.g. the single matching inductor) and an inductor bias ($V_{LB}$) serve as a series-resonant driver for driving the clock signals to the true single-phase clocking latch circuit.

The plurality of input data lines (e.g. $DATA_1$, $DATA_2$, ... $DATA_N$) may be passed into the plurality of sampling flip flop latches in the true single-phase clocking latch circuit. An arrival of the timing pulse and the plurality of input data lines that are resonated are matched by connecting one or more of their respective load capacitances with at least one shared inductor. The input timing pulse and the plurality of input data lines improve the timing performance and timing closure on advanced semiconductor manufacturing processes using the at least one shared inductor (e.g. a at least one shared latch output inductor ($L_{SS}$)) and the single clock inductor ($L_{CLOCK}$) (e.g. the single matching inductor) respectively. In another embodiment, an interface between the timing pulse and the plurality of input data lines is characterized by the timing which the input data takes with respect to the clock to latch on the plurality of input data lines.

In an embodiment, the arrival of the timing pulse and the plurality of input data lines to the plurality of latches are substantially matched by their respective (clock and logic-cell) series resonances to minimize clock skew and data skew. The skew may be the mismatch of timing between the data signal and the clock signal. In another embodiment, the clock and data signals comprise a tracking jitter and same edges when the absolute skews for the clock and data signals are not at minimum.

In an embodiment, the delay inductance and capacitance of the pulse generator circuit matches the resonance pulse width of a Pulsed Series Resonance (PSR) output. In an embodiment, in an absence of the voltage doubler, the inductor bias ($V_{LB}$) as low as $V_{DD}/4$ may be used to achieve lower $V_{OL}$ levels when effective Q value is small. The pulse widths may be programmed to full $T_R$ than 0.5 $T_R$. In an embodiment, the pulses are available on both edges of the clock signal to support DDR. The latch (e.g. the true single-phase clocking latch) may be used instead of master slave flip flops. This true single-phase clocking latch is referred to as Explicit-pulsed true single-phase clocked flip flop (epTSPC).

According to one embodiment, a distributed clock path comprising a plurality of capacitances, a plurality of nodes, and the matched resonance circuit that is placed at appropriate nodes selected from the plurality of nodes in the distributed clock path to enable the distributed clock to drive a clock signal in the plurality of sampling flip-flop latches to reduce power wastage. The matched resonance circuit is placed at the appropriate nodes that are selected from the plurality of nodes using the at least one shared inductor connected with the latch circuit. In an embodiment, the plurality of nodes enables the distributed clock path to drive the clock signal in the plurality of sampling flip-flop latches using a H-tree.

According to another embodiment, the plurality of nodes is connected in series for the distributed clock path of a clock distribution network (CDN) for series resonance to improve the timing closure in the plurality of sampling flip-flop latches. According to yet another embodiment, the pulse generator circuit is auto-calibrated to generate precise pulses that are required for power savings. In an embodiment, a transmission gate (TG) comprises of PMOS (P-type Metal Oxide Semiconductor) transistor and NMOS (N-type Metal Oxide Semiconductor) transistor in parallel. The transmission gate may be replaced by the optimum resistance to be as the auto-calibrated pulse generator circuit with the same shared inductor. The auto-calibration identifies a suitable resistor by changing the voltage currently on the third node at the pulse generator circuit. The transmission gate is connected in the closed proximity in the PMOS transistor and the NMOS transistor of the auto-calibrated pulse generator circuit by replacing the optimum resistance to attain best pulse width to obtain the maximum power.

According to yet another embodiment, the latch obtains a sharp and controlled slope from a clock driver for enabling a clean clock edge (e.g. a sharp clock edge) to prevent malfunctions from undefined values and race conditions on the plurality of input data lines, and the matched resonance circuit passes only a single frequency to reduce a jitter for both clock and data lines using the at least one shared inductor and matching inductor and their time period. In an embodiment, an ideal dual edge-triggered (DET) flip flop allows the plurality of input data lines throughput as a single edge-triggered flip flop while operating at half of the clock frequency.

According to yet another embodiment, the pulse generator circuit creates controlled sharp clock edges to trigger the plurality of sampling flip-flop latches and an interconnected parasitic capacitance ($C_L$), in parallel to weigh down the clock signal. According to yet another embodiment, the plurality of input data lines includes a plurality of static logic cells. The plurality of static logic cells may produce a data path with the help of the latch circuit (e.g. the true single-phase clocking latch).

The present disclosure provides a method for matched clock and data timing performance for improving timing closure of digital circuits to increase speed that is divided by power performance on advanced semiconductor manufacturing processes with large on chip variation (OCV) of delays, that includes:

allowing a clock input into a pulse generator circuit to generate positive timing pulses, wherein the pulse generator circuit comprises (a) a plurality of inverters, (b) an optimum resistance and (c) an exclusive OR (Ex-OR) gate which are connected in series and (d) a matched capacitance;

generating, using one or more buffers and a clock inductor, a timing pulse output;

generating, using the pulse generator circuit, a precise pulse width timing for resonating parasitic capacitances that cause unknown timing delays and power consumption;

connecting a plurality of generating latches and a plurality of sampling latches in series with an output of the pulse generator circuit, wherein each of the plurality of generating latches comprises at least one output, wherein the outputs of the generating latches providing timing for a plurality of input data lines, wherein each of the plurality of data lines comprises at least one logic cell and at least one output, wherein the outputs of the plurality of data lines provide inputs to a plurality of sampling flip-flop latches, wherein the plurality of input data lines are thus passed into the plurality of sampling flip-flop latches; and receiving the clock timing pulse output as a timing pulse into the plurality of sampling flip-flop latches through a clock sample path (CS) to match an arrival of the timing pulse and the outputs of the plurality of input data lines that are resonated by connecting one or more of their respective load capacitances with at least one shared inductor, wherein the input timing pulse and the plurality of input data lines improve the timing performance and timing closure using at least one shared inductor for data and the single clock inductor for clock (e.g. a single matching inductor) respectively.

The advantages of the present method are thus identical to those disclosed above in connection with the matched resonance circuit and the embodiments listed above in connection with the system apply mutatis mutandis to the method.

Embodiments of the present disclosure used to improve the timing performance and timing closure of digital circuits to increase performance on advanced semiconductor manufacturing processes. Embodiments of the present disclosure are further used to minimize the power consumption consumed by the digital circuit to improve the performance of advanced semiconductor manufacturing processes.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the method and system disclosed herein provide a matched resonance circuit for improving clock and data timing performance and timing closure of digital circuits to increase performance on advanced semiconductor manufacturing processes. Furthermore, an timing pulse and the plurality of input data lines in the matched resonance circuit is resonated using at least one shared inductor and a single clock inductor (a single matching inductor) respectively to improve the timing performance and timing closure on advanced semiconductor manufacturing processes. Referring now to the drawings, and more particularly to FIGS. 2A through 7, where similar reference characters denote corresponding features consistently throughout the figures, there are shown preferred embodiments.

FIG. 1 illustrates a prior-art top level block diagram determining the timing closure constraints. The block diagram includes a generating flop 102, the plurality of logic cells 104A-N, a sampling flop 106 and a (Pulsed Series Resonance) PSR inverter 110. The generating flop 102 passes a clock signal through a clock generate path (CG) using a clock grid 108. The data is transferred from the generating flop 102 to the sampling flop 106 through the data path using the plurality of logic cells 104A-N. A plurality of clock sample signals is passed through a clock sample path (CS) using a plurality of clock buffers 107A-B into the sampling flop 106. The functions of these parts as have been described above.

FIG. 2A illustrates a resonant circuit for matched clock and data timing performance for improving timing closure in the digital circuits for increased speed that is divided by power performance on advanced semiconductor manufacturing processes according to an embodiment herein. The matched resonance circuit includes a pulse generator circuit 202, a single clock inductor (a single matching inductor) 204, a latch 206, a back-to-back inverter 207, at least one shared inductor 208 and an output driver 209. The pulse generator circuit 202 includes a plurality of inverters 210A-N, a delay inductance 212, an optimum resistance 214 and a matched capacitance 216 and an exclusive OR (Ex-OR) gate 218. The functions of these parts as have been described above.

Figure 2B:
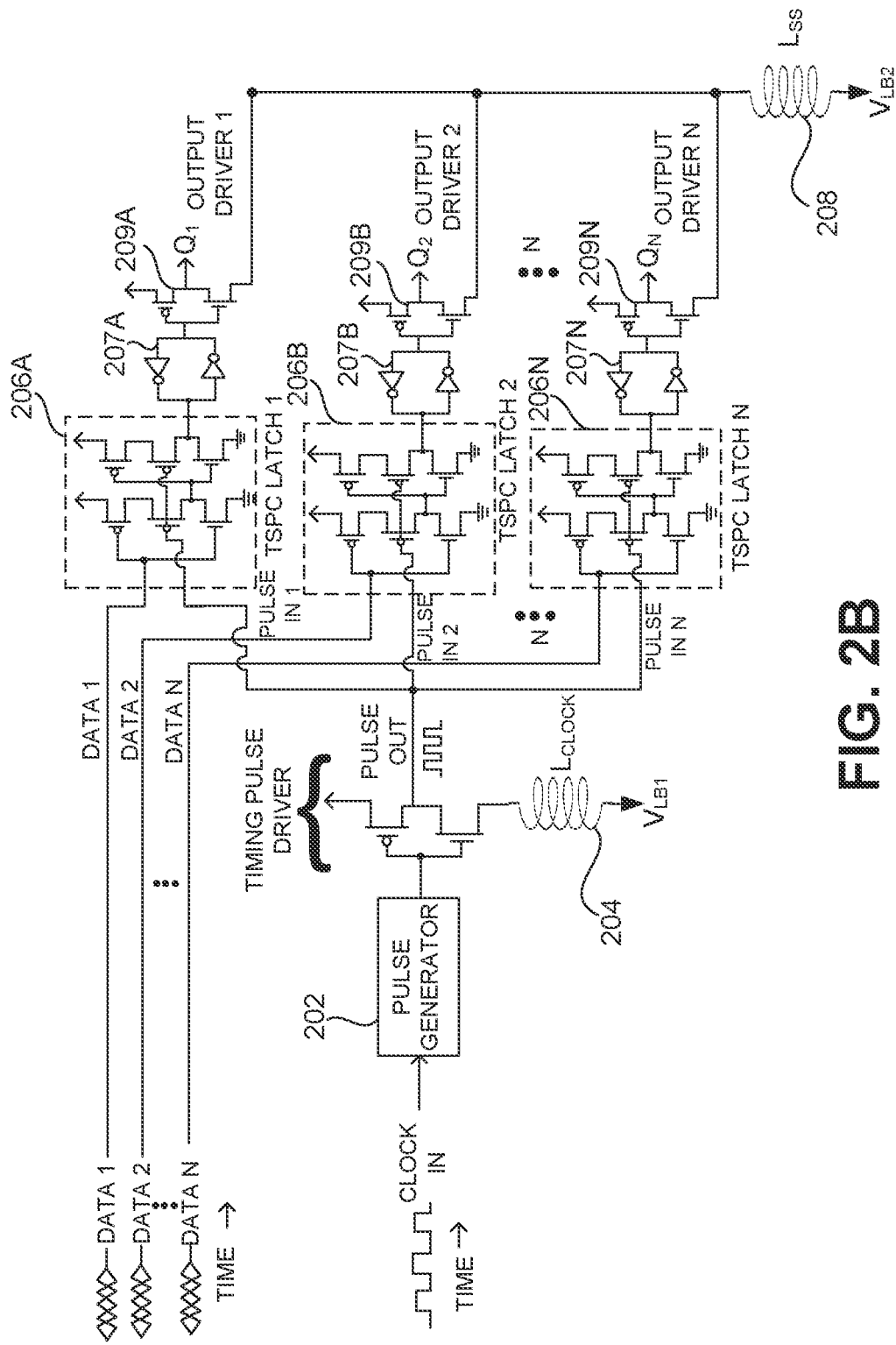
FIG. 2B illustrates the matched resonant circuit that includes a plurality of input data lines connected to a plurality of latches that is connected in series with at least one shared inductor of FIG. 2A according to an embodiment herein.

FIG. 2B illustrates the matched resonant circuit that includes a plurality of input data lines connected to a plurality of latches 206A-N that is connected in series with the at least one shared inductor 208 of FIG. 2A according to an embodiment herein. The matched resonant circuit includes a pulse generator circuit 202, a single clock inductor (a single matching inductor) 204, the plurality of latches 206A-N, a plurality of back-to-back inverters 207A-N, at least one shared inductor 208 and a plurality of output drivers 209A-N. The plurality of latches 206A-N includes a plurality of input data lines. The functions of these parts as have been described above.

Figure 3:
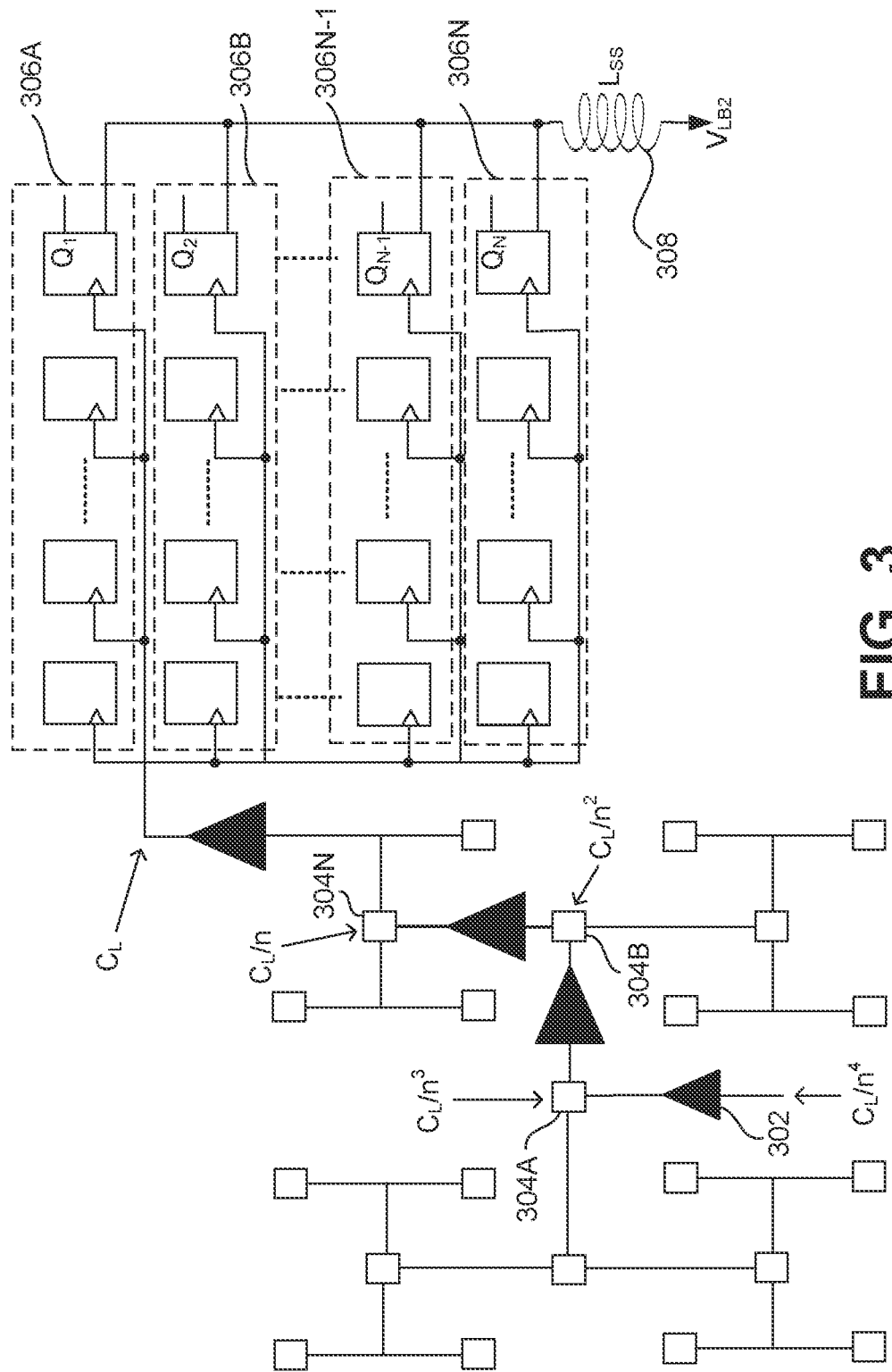
FIG. 3 illustrates a distributed clock path that drives a plurality of sampling flip flop latches using a plurality of series clock drivers in a clock distribution network (CDN) for series resonance according to the supporting embodiments herein.

FIG. 3 illustrates a distributed clock path that drives a plurality of sampling flip-flop latches 306A-N using a plurality of series clock drivers in a clock distribution network (CDN) for series resonance according to the supporting embodiments herein. The distributed clock path in a H-tree includes a buffer 302 and a plurality of nodes 304A-N. A matched resonance circuit is placed in the appropriate nodes selected from the plurality of nodes 304A-N to enable the distributed clock path to drive a clock signal in the plurality of sampling flip-flop latches 306A-N of the plurality of latches. The latches are connected with at least one shared inductor 308 to improve the timing performance and timing closure of digital circuits to increase performance on advanced semiconductor manufacturing processes.

Figure 4:
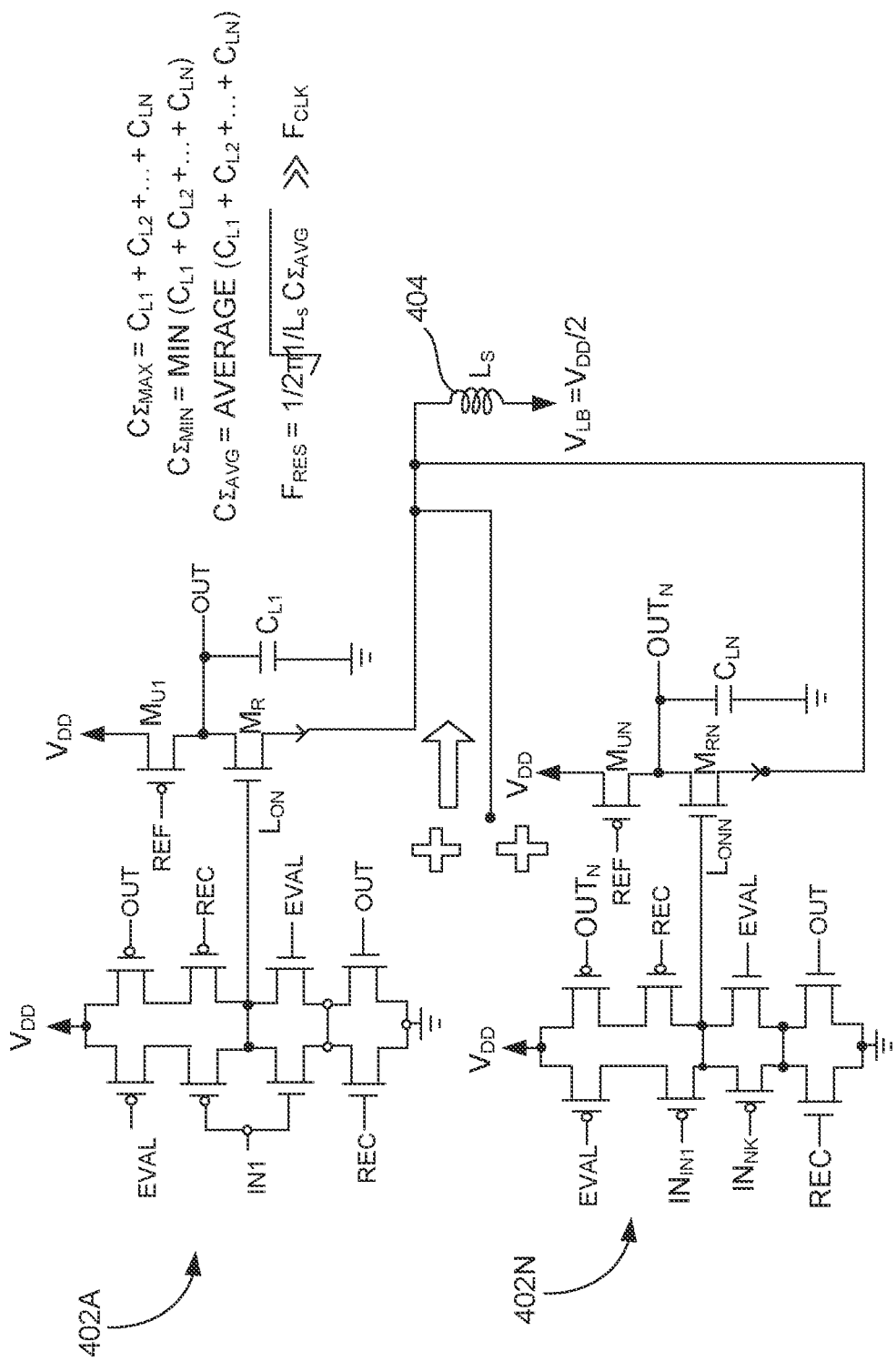
FIG. 4 illustrates an exemplary matched resonance circuit including a plurality of digital circuits, where each of plurality of digital circuits is connected in series with at least one shared inductor to achieve the series resonance according to an embodiment herein.

FIG. 4 illustrates an exemplary matched resonance circuit including a plurality of digital circuits 402A-N, where each of plurality of digital circuits 402A-N is connected in series with at least one shared inductor 404 to achieve the series resonance according to an embodiment herein. The plurality of digital circuits 402A-N is connected to the at least one shared inductor 404. The functions of these parts as have been described above.

Figure 5:
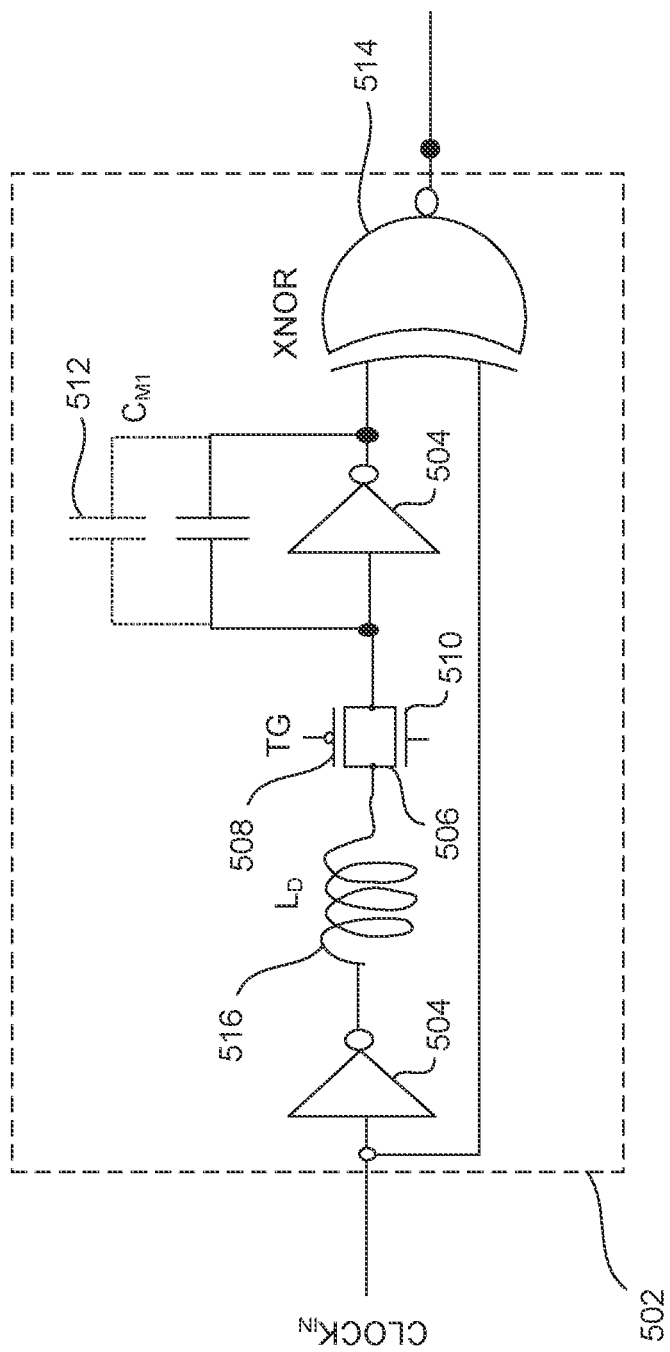
FIG. 5 illustrates a pulse generator circuit that is auto-calibrated to generate the precise pulses that are required for energy savings in digital circuits according to an embodiment herein.

FIG. 5 illustrates a pulse generator circuit 502 that is auto-calibrated to generate the precise pulses that are required for energy savings in digital circuits according to an embodiment herein. The pulse generator circuit 502 comprises a plurality of inverters 504, a delay inductance 516, a transmission gate 506, a matched capacitance 512 and an exclusive NOR (XNOR) gate 514. The transmission gate 506 comprises of PMOS transistor 508 and NMOS transistor 510 that are connected together in parallel. The functions of these parts as have been described above.

Figure 6:
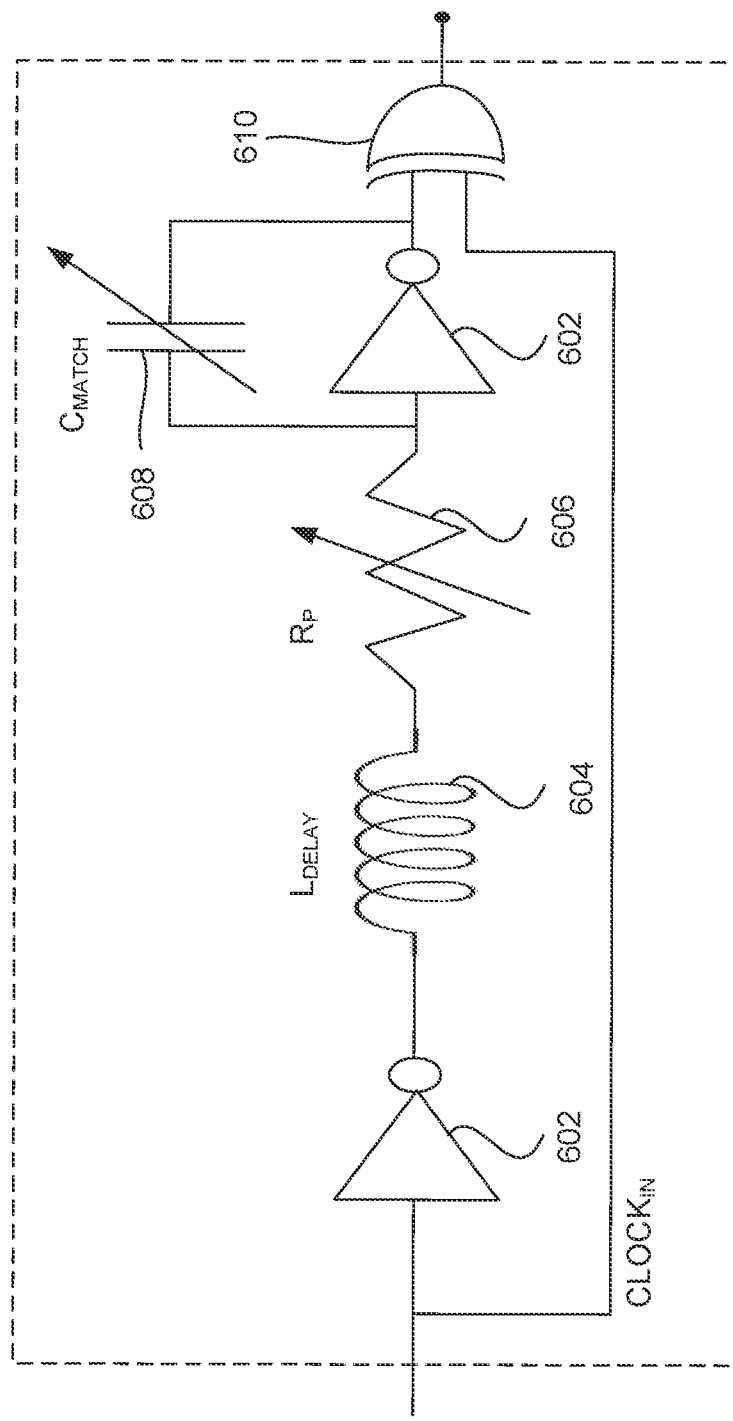
FIG. 6 illustrates a pulse generator circuit according to an embodiment herein.

FIG. 6 illustrates a pulse generator circuit according to an embodiment herein. The pulse generator circuit comprises a plurality of inverters 602, a delay inductance 604, a parasitic resistance ($R_p$) 606, a matched capacitance 608 and an exclusive OR (XOR) gate 610. The functions of these parts as have been described above.

Figure 7:
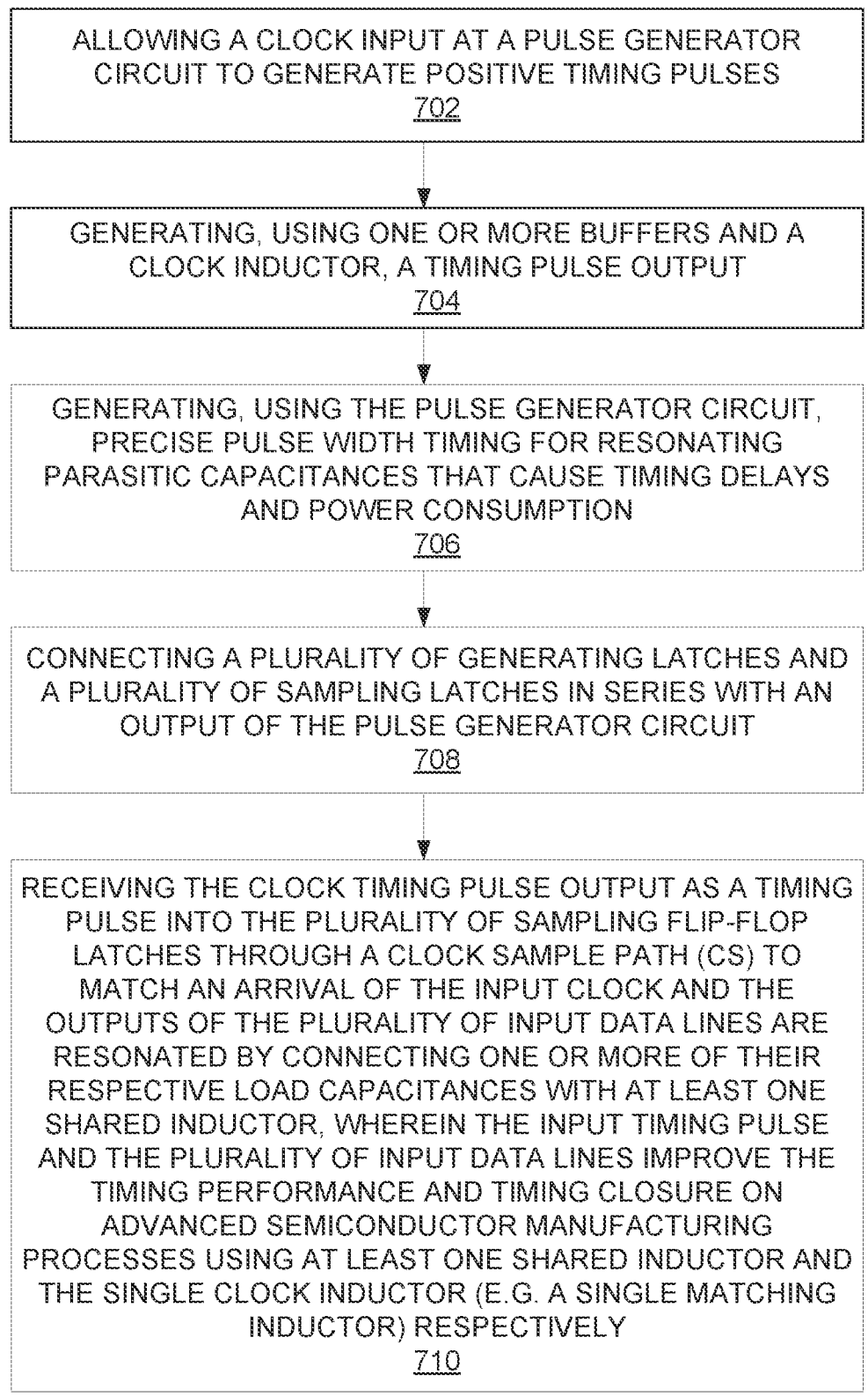
FIG. 7 is a flow diagram illustrates a method for matched clock and data timing performance for improving timing closure in digital circuits for increased speed that is divided by power performance on advanced semiconductor manufacturing processes using a resonance circuit according to an embodiment herein.

FIG. 7 is a flow diagram illustrates a method for matched clock and data timing performance for improving timing closure in digital circuits for increased speed that is divided by power performance on advanced semiconductor manufacturing processes using a matched resonance circuit according to an embodiment herein. At step 702, a clock input is allowed at a pulse generator circuit to generate positive timing pulses. At step 704, a timing pulse output is generated using one or more buffers and a clock inductor. At step 706, precise pulse width timing is generated for resonating parasitic capacitances that cause unknown timing delays and power consumption using the pulse generator circuit. At step 708, a plurality of generating latches and a plurality of sampling latches are connected in series with an output of the pulse generator circuit. Each of the plurality of generating latches comprises at least one output. The outputs of the generating latches providing timing for a plurality of input data lines. Each of the plurality of data lines comprises at least one logic cell and at least one output. The outputs of the plurality of data lines provide inputs to a plurality of sampling flip-flop latches. The plurality of input data lines are thus passed into the plurality of sampling flip-flop latches. At step 710, the clock timing pulse output is received as a timing pulse into a plurality of sampling flip flop latches through a clock sample path (CS) to match an arrival of the input timing pulse and the outputs of plurality of input data lines that are resonated by connecting one or more of their respective load capacitances with at least one shared inductor. The input timing pulse and the plurality of input data lines improve the timing performance and timing closure using at least one shared inductor for data and the single clock inductor for clock (e.g. a single matching inductor) respectively.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A matched resonant circuit for matched clock and data timing performance for improving timing closure of digital circuits to increase speed performance and power performance on advanced semiconductor manufacturing processes with large on chip variation (OCV) of delays, comprising:
    a pulse generator circuit (202) that comprises (a) a plurality of inverters (210A-N), (b) an optimum resistance (214) and (c) an exclusive OR (Ex-OR) gate (218) which are connected in series and (d) a matched capacitance (216), wherein the pulse generator circuit (202) allows a clock input to generate positive timing pulses, wherein the pulse generator (202) generates a timing pulse output using one or more buffers and a clock inductor, wherein the pulse generator circuit (202) generates precise pulse width timing for resonating parasitic capacitances that cause unknown timing delays and power consumption;
    having a load capacitance driver where PMOS inputs and NMOS inputs are isolated electrically;
    a plurality of generating latches (206A-N) and a plurality of sampling flip-flop latches (304A-N) that are connected in series with an output of the pulse generator circuit (202), wherein each of the plurality of generating latches (206A-N) comprises at least one output, wherein outputs of the plurality of generating latches (206A-N) provide a timing for a plurality of input data lines, wherein each of the plurality of input data lines comprises at least one logic cell and at least one output, wherein outputs of the plurality of input data lines provide inputs to a plurality of sampling flip-flop latches (304A-N), wherein the plurality of input data lines are thus passed into the plurality of sampling flip-flop latches (304A-N), characterized in that wherein each generating latch receives a clock timing pulse output as a timing pulse into the plurality of sampling flip-flop latches (304A-N) through a clock sample path (CS) to match an arrival of the timing pulse and the outputs of the plurality of input data lines; and
    characterized in that at least one shared inductor (208) resonates a plurality of data lines, wherein the plurality of data lines are resonated by connecting one or more of their respective load capacitances with at least one shared inductor (208), wherein an input timing pulse and the plurality of input data lines improve the data timing performance and the timing closure using at least one shared inductor (208) for data and a single clock inductor (204) for clock (e.g. a single matching inductor) respectively.

2. A distributed clock path comprising a plurality of capacitances and a plurality of nodes, wherein the matched resonant circuit as claimed in claim 1 is placed at appropriate nodes selected from a plurality of nodes (302A-N), in the distributed clock path to enable a distributed clock to drive a clock signal in the plurality of sampling flip-flop latches (304A-N) to reduce power wastage.

3. The matched resonant circuit as claimed in claim 2, characterized in that wherein the plurality of nodes (302A-N) are connected in series for the distributed clock path of a clock distribution network (CDN) for series resonance to improve the timing closure in the plurality of sampling flip-flop latches (304A-N).

4. The matched resonant circuit as claimed in claim 1, characterized in that wherein the pulse generator circuit (202) is auto-calibrated by replacing the optimum resistance (214) by a transmission gate (506) to generate precise pulses that are required for power savings.

5. The matched resonant circuit as claimed in claim 4, characterized in that wherein a transmission gate (TG) (506) comprises PMOS (P-type Metal Oxide Semiconductor) transistor (508) and NMOS (N-type Metal Oxide Semiconductor) transistor (510) in parallel.

6. The matched resonant circuit as claimed in claim 1, characterized in that wherein the plurality of latches (206A-N, 304A-N) obtain sharp and controlled slope from a clock driver for enabling a clean clock edge (a sharp clock edge) to prevent malfunctions from undefined values and race conditions on the plurality of input data lines, wherein the matched resonance circuit passes only a single frequency to reduce jitter for both clock and data lines using at least one shared inductor (208) and matching inductor and their time period.

7. The matched resonant circuit as claimed in claim 4, characterized in that wherein the pulse generator circuit (202) creates controlled sharp clock edges to trigger the plurality of sampling flip-flop latches (304A-N) and an interconnected parasitic capacitance (CL), in parallel to weighs down the clock signal.

8. The matched resonant circuit as claimed in claim 1, characterized in that wherein the plurality of input data lines comprises a plurality of static logic cells.

9. A method for matched clock and data timing performance for improving timing closure of digital circuits to increase speed performance and power performance on advanced semiconductor manufacturing processes with large on chip variation (OCV) of delays, comprising:
    allowing a clock input into a pulse generator circuit (202) to generate positive timing pulses, wherein the pulse generator circuit (202) comprises (a) a plurality of inverters (210A-N), (b) an optimum resistance (214) and (c) an exclusive OR (Ex-OR) gate (218) which are connected in series and (d) a matched capacitance (216);
    generating, using one or more buffers and a clock inductor, a timing pulse output;
    generating, using the pulse generator circuit (202), a precise pulse width timing for resonating parasitic capacitances that cause unknown timing delays and power consumption;

connecting a plurality of generating latches (206A-N) and a plurality of sampling flip-flop latches (304A-N) in series with an output of the pulse generator circuit (202), wherein each of the plurality of generating latches (206A-N) comprises at least one output, wherein outputs of the generating latches (206A-N) providing timing for a plurality of input data lines, wherein each of the plurality of input data lines comprises at least one logic cell and at least one output, wherein the outputs of the plurality of data lines provide inputs to a plurality of sampling flip-flop latches (304A-N), wherein the plurality of input data lines are thus passed into the plurality of sampling flip-flop latches (304A-N); and characterized in that receiving the clock timing pulse output as a timing pulse into the plurality of sampling flip-flop latches (304A-N) through a clock sample path (CS) to match an arrival of the timing pulse and the outputs of the plurality of input data lines;

resonating the plurality of input data lines by connecting one or more of their respective load capacitances with at least one shared inductor (208), wherein an input timing pulse and the plurality of input data lines improve the timing performance and the timing closure using at least one shared inductor (208) for data and the single clock inductor (204) for clock (e.g. a single matching inductor) respectively.

\* \* \* \* \*